(12) United States Patent
Cheng et al.

(10) Patent No.: US 11,345,844 B2
(45) Date of Patent: May 31, 2022

(54) OIL WELL CEMENT SLURRY HIGH-TEMPERATURE SUSPENSION STABILIZER PREPARED FROM OIL-BASED SHALE DRILLING CUTTINGS

(71) Applicants: SOUTHWEST PETROLEUM UNIVERSITY, Chengdu (CN); SOUTHWEST PETROLEUM UNIVERSITY ENVIRONMENTAL PROTECTION TECHNOLOGY (CHENGDU) CO., LTD, Chengdu (CN)

(72) Inventors: Xiaowei Cheng, Chengdu (CN); Gaoyin Zhang, Chengdu (CN); Shunxiang Luo, Chengdu (CN); Zuwei Chen, Chengdu (CN); Sheng Huang, Chengdu (CN); Kaiqiang Liu, Chengdu (CN); Chunmei Zhang, Chengdu (CN); Kaiyuan Mei, Chengdu (CN); Jian Liu, Chengdu (CN); Zaoyuan Li, Chengdu (CN); Xiaoyang Guo, Chengdu (CN)

(73) Assignees: SOUTHWEST PETROLEUM UNIVERSITY, Chengdu (CN); SOUTHWEST PETROLEUM UNIVERSITY ENVIORMENTAL PROTECTION TECHNOLOGY (CHENGDU) CO., LTD, Chengdu (CN)

( * ) Notice: Subject to any disclaimer, the term of this patent is extended or adjusted under 35 U.S.C. 154(b) by 204 days.

(21) Appl. No.: 16/887,336

(22) Filed: May 29, 2020

(65) Prior Publication Data

US 2020/0392393 A1    Dec. 17, 2020

(30) Foreign Application Priority Data

Jun. 12, 2019 (CN) .......................... 201910507276.1

(51) Int. Cl.
*C09K 8/467* (2006.01)
*C04B 18/12* (2006.01)
*C04B 20/02* (2006.01)
*C04B 20/04* (2006.01)
*E21B 21/01* (2006.01)

(52) U.S. Cl.
CPC ............ *C09K 8/467* (2013.01); *C04B 18/125* (2013.01); *C04B 20/026* (2013.01); *C04B 20/04* (2013.01); *E21B 21/01* (2013.01)

(58) Field of Classification Search
None
See application file for complete search history.

(56) References Cited

U.S. PATENT DOCUMENTS

| | | | |
|---|---|---|---|
| 2010/0288618 A1* | 11/2010 | Feerer | C10B 47/44 202/118 |
| 2016/0194555 A1* | 7/2016 | Malachosky | C09K 8/805 507/269 |

FOREIGN PATENT DOCUMENTS

| | | |
|---|---|---|
| CN | 107629971 A | 1/2018 |
| CN | 107973537 A | 5/2018 |
| CN | 108706927 A | 10/2018 |

OTHER PUBLICATIONS

Yao, Xiao, et al. "Resource Utilization of Pyrolysis Oil Cuttings: Study of the Performance Cement Slurry with Drilled Cuttings Residue", In: Chinese Journal of Environmental Engineering, 2018, vol. 35, No. 1, pp. 94-100.

Cai, Hao et al. "Solidification Technology of Oil-based Drilling Cuttings of Shale Gas Well" In: Journal of Environmental Engineering, 2017, vol. 11, No. 5, pp. 3120-3127.

* cited by examiner

*Primary Examiner* — Andrew Sue-Ako
(74) *Attorney, Agent, or Firm* — Pearne & Gordon LLP

(57) ABSTRACT

An oil well cement slurry high-temperature suspension stabilizer prepared from oil-based shale drilling cuttings is provided. The high-temperature suspension stabilizer is reasonable in principle, inexpensive and easily available in raw materials, high in product uniformity and good in chemical stability. Meanwhile, waste is changed into wealth. Therefore, the high-temperature suspension stabilizer is environment-friendly and has a broad industrial application prospect.

4 Claims, No Drawings

OIL WELL CEMENT SLURRY HIGH-TEMPERATURE SUSPENSION STABILIZER PREPARED FROM OIL-BASED SHALE DRILLING CUTTINGS

TECHNICAL FIELD

The present invention relates to an oil well cement slurry high-temperature suspension stabilizer prepared from oil-based shale drilling cuttings, which belongs to high-performance inorganic materials and is applied to the field of oil and gas development.

BACKGROUND ART

With the gradual exploitation of oil and gas reservoirs, there are more and more deep wells and ultra-deep wells. Downhole pressure, temperature, strata and other environments have become more and more complex, which has higher requirements for various performance indicators of cement slurry for well cementation. As one of the important indicators to ensure the safety and success of well cementation, the stability of cement slurry has received more and more attention. The cement slurry, which is a heterogeneous solid-liquid mixture, is essentially a system with an unstable settlement performance composed of a plurality of solid materials with different densities and different particle sizes. Therefore, a suspension stabilizer is usually added to cement slurry for oil well cementation to enhance the settlement stability of the slurry.

Researchers have conducted a lot of researches on the comprehensive utilization of oil well cement slurry suspension stabilizers and oil-based shale drilling cuttings. In the invention patent application "Preparation Method of Low-viscosity and High-cut Oil Well Cement Suspension Stabilizer for Large Temperature Difference Cementation" (201710903566.9), functional groups with a certain spatial structure and hydrophobic properties are introduced into a polymer backbone with high temperature resistance and hydrophilic effect by carrying out surface graft copolymerization on the polymer backbone, to achieve improved settlement stability of cement slurry for well cementation. In the invention patent application "A Suspension Stabilizer for High Temperature Cement Slurry and High Temperature Resistant Cement Slurry Prepared Therefrom" (201810476518.0), fiber materials, surfactant powder materials and flocculant powder materials are mixed according to a fixed mass ratio to prepare a suspension stabilizer suitable for oil well cement slurry. In the invention patent application "A Suspension Agent for High Temperature Resistant Flexible Cement Slurry and Its Preparation Method and Cement Slurry" (201610937072.8), a suspension stabilizer suitable for oil well cement slurry is prepared by mixing spherical oxides, short fibers, silicate and latex according to a fixed mass ratio. The above preparation methods require more materials that need to be specially purchased. The cost of preparations is higher, the preparation process is more complicated, and the suspension stability is unstable under high temperature environments.

Shale gas refers to a kind of unconventional natural gas existing in organic matter-rich shale in a reservoir bedrock system, and the shale formation needs to be drilled during shale gas exploitation. Because the underground shale formation has the characteristics of easy expansion, cracking and breakage when meeting water, which leads to the collapse of the well wall, oily drilling fluid is needed during the selection of drilling fluid, resulting in a large amount of oil-based shale drilling cuttings in the formation. In order to prevent the ecological environment from being damaged, the oil-based shale drilling cuttings, which are a kind of drilling waste residues, are not allowed to be discharged at will because they contain heavy metals and some petroleum hydrocarbon organic matters. Even if they are discharged after specific treatments (such as a pyrolysis technology, a chemical desorption technology, a microbial treatment technology, etc.), the oil-based shale drilling cuttings will still produce secondary pollution. Therefore, how to maximize the utilization of the oil-based shale drilling cuttings and solve the existing large-area yard stacking problem has been urgent.

At present, in the treatment of oil-based shale drill cuttings, Yao Xiao, Cai Hao, et al., have realized the utilization of rock cuttings by adding oil-based rock cuttings pyrolyzed at a certain temperature as filler to the cement slurry (Yao Xiao, Cai Hao, Wang Gaoming, et al., Resource Utilization of Pyrolysis Oil-based Drilling Cuttings (II): Performance of Residue-doped Cement Slurry System [J]. Drilling Fluid and Completion Fluid, 35 (2018): 94-100; Cai Hao, Wu Bo, Yao Xiao, et al., Solidification Technology of Oil-based Drilling Cuttings of Shale Gas Well [J]. Journal of Environmental Engineering, 11 (2017): 3120-3127). However, this method is still in the laboratory research stage, and the specific effect of the oil-based rock cuttings which are used as low-end filler has yet to be verified. The present invention utilizes shale rich in clay minerals and organic matters, as well as microporosity (nano-level pore development) to prepare a high-temperature suspension stabilizer for oil well cement slurry, which achieves resource utilization of wastes while solving environmental pollution problems.

SUMMARY OF THE INVENTION

An object of the present invention is to provide an oil well cement slurry high-temperature suspension stabilizer prepared from oil-based shale drilling cuttings. The suspension stabilizer is prepared from the oil-based shale drilling cuttings as a raw material. In combination with high-temperature melting and quenching processes, the calcination temperature and the calcination time are controlled strictly in different temperature sections. Therefore, the suspension stabilizer of the present invention is reliable in principle of the preparation process, cheap and easily available in raw materials, high in product uniformity and good in chemical stability. Meanwhile, waste is changed into wealth. Therefore, the suspension stabilizer is environment-friendly and has a broad industrial application prospect.

To fulfill the above technical object, the present invention adopts the following technical solutions.

An oil well cement slurry high-temperature suspension stabilizer is prepared from oil-based shale drilling cuttings by a method comprising the following steps:

(1), performing preliminary pyrolysis on the oil-based shale drilling cuttings in a shale formation in a pyrolysis furnace under a heating program in the air atmosphere in which the temperature is raised from room temperature to 350-400° C., and the heating time is 30-45 min; the temperature is preserved at 350-400° C., and the heat preservation time is 75-90 min; grinding the oil-based shale drilling cuttings after the preliminary pyrolysis and controlling a specific surface area of particle size after grinding to 200-300 $m^2$/Kg; and (2), placing the oil-based shale drilling cuttings after preliminary pyrolysis and grinding in a corundum crucible and putting the corundum crucible in a resistance furnace, and performing heat treatment for the second time under conditions as follows: the temperature is raised from room temperature to 800° C., the heating time is 45-60 min; the temperature is preserved at 800° C., and the heat preservation time is 60-75 min; the temperature is continuously raised to 1000° C., and the heating time is 30-45 min; the temperature is preserved at 1000° C., and the heat preservation time is 60-90 min; then, cooling in a quenching and shock cooling manner, drying at 60° C. for 24 h, and grinding to obtain powder having a specific surface area of 400 $m^2$/Kg, that is, the oil well cement slurry high-temperature suspension stabilizer is prepared.

The oil-based shale drilling cuttings are drilling cuttings produced when natural gas is extracted by drilling in an oily drilling fluid environment in the shale formation.

The oil-based shale drilling cuttings are taken from black shale of the Silurian Longmaxi Formation.

In the quenching and shock cooling process, water or liquid nitrogen is used as a quenching medium.

In the present invention, the oil-based shale drilling cuttings are preliminarily pyrolyzed in the pyrolysis furnace to remove free water, bound water, and most of oily hydrocarbons. The oil-based shale drilling cuttings after preliminary pyrolysis are ground and split to facilitate heat convection, conduction and radiation efficiencies in the later heat treatment, such that the product structure is more uniform, and the preparation cycle can be shortened.

Compared with the prior art, the present invention has the following beneficial effects:
(1) the suspension stabilizer of the present invention has a wide range of raw materials and low cost, and can consume a large amount of oil-based shale drilling cuttings by converting the oil-based shale drilling cuttings into wealth for reuse, thereby avoiding the environmental pollution caused by storage of the oil-based shale drilling cuttings;
(2) the waste residues produced by shale gas mining are then used in oil and gas well cementation, such that the high-temperature suspension stabilizer can be prepared on site to reduce the huge transportation cost; and the preparation method is simple and the yield is high, thereby providing feasibility for large-scale preparation; and
(3) The hydrocarbons taken from the interiors of hale particles under a shale formation are burned to form uniform pore structures inside the particles, and when the heat-treated drilling cuttings are added to the oil well cement slurry, this structure can be used to fill the cement slurry to improve the settlement stability of the slurry.

In summary, the suspension stabilizer of the present invention is reliable in principle, high in yield, relatively low in requirements on the quality of raw materials, cheap and easily available in raw materials, high in product homogeneity, good in chemical stability and stable in structure; meanwhile, waste is changed into wealth to reduce the pollution. Therefore, the suspension stabilizer is environment-friendly and has a broad industrial application prospect.

DETAILED DESCRIPTION

The present invention will be further described in detail with reference to the specific embodiments.

Embodiment 1

An oil well cement slurry high-temperature suspension stabilizer is prepared from oil-based shale drilling cuttings by a method comprising the following steps:

(1) 400 g of oil-based shale drilling cuttings brought back from the site are placed in a pyrolysis furnace for pyrolysis to remove most of oily hydrocarbons, wherein the temperature in the pyrolysis furnace is raised from room temperature to 400° C., the heating time is 30 min, and the heat preservation time is 90 min; at this time, no droplets are generated in a condensation device behind the pyrolysis furnace, and no ignitable gas is generated in the exhaust gas; and the drilling cuttings in the pyrolysis furnace are cooled along with the furnace. The cuttings subjected to preliminary pyrolysis are grounded, and the specific surface area of the powder after grinding is controlled to about 200 $m^2$/Kg;

(2) the pyrolysis drilling cuttings after grinding are heat treatment for the second time, and the heating and heat preservation programs are controlled strictly (the temperature is raised from room temperature to about 800° C. again, and the heating time is 45 min; the temperature is preserved at 800° C., and the heat preservation time is 75 min; the temperature is continuously raised to 1000° C., and the heating time is 30 min; the temperature is preserved at 1000° C., and the heat preservation time is 90 min). The heat-treated material after the heat preservation is immediately poured into a quenching medium for quenching treatment, and water or liquid nitrogen is used as the quenching medium during the quenching process. After the quenching is completed, the powder is placed in an oven at 60° C. and dried for 24 hours; the powder is then taken out and ground; and the specific surface area of the ground powder is controlled to be 400 $m^2$/Kg to obtain a microparticle suspension stabilizer.

Embodiment 2

An oil well cement slurry high-temperature suspension stabilizer is prepared from oil-based shale drilling cuttings by a method comprising the following steps:

(1) 600 g of oil-based shale drilling cuttings are placed in a pyrolysis furnace for pyrolytic ignition loss, wherein the temperature in the pyrolysis furnace is raised from room temperature to 400° C., the heating time is 45 min, and the heat preservation time is 75 min; at this time, no droplets are generated in a condensation device behind the pyrolysis furnace, and no ignitable gas is generated in the exhaust gas; and the drilling cuttings in the pyrolysis furnace are cooled along with the furnace. The cuttings subjected to preliminary pyrolysis are grounded, and the specific surface area of the powder after grinding is controlled to about 300 $m^2$/Kg;

(2) the pyrolysis drilling cuttings after grinding are subjected to heat treatment for the second time, and the heating and heat preservation programs are controlled strictly during the treatment process (the temperature is raised from room temperature to about 800° C. again, the heating time is 60 min; the temperature is preserved at 800° C., and the heat preservation time is 60 min; the temperature is raised to 1000° C., and the heating time is 45 min; the temperature is preserved at 1000° C., and the heat preservation time is 60 min). The heat-treated material after the heat preservation is immediately poured into a quenching medium for quenching treatment, and water or liquid nitrogen is used as the quenching medium during the quenching process. After the quenching is completed, the powder is placed in an oven at 60° C. and dried for 24 hours; the powder is then taken out and ground; and the specific surface area of the ground powder is controlled to be 400 m²/Kg to obtain a microparticle suspension stabilizer.

Embodiment 3

An oil well cement slurry high-temperature suspension stabilizer is prepared from oil-based shale drilling cuttings by a method comprising the following steps:

(1) 1 kg of oil-based shale drilling cuttings brought back from the site are placed in a pyrolysis furnace for pyrolysis to remove most of oily hydrocarbons, wherein the temperature in the pyrolysis furnace is raised from room temperature to 400° C., the heating time is 45 min, and the heat preservation time is 90 min; at this time, no droplets are generated in a condensation device behind the pyrolysis furnace, and no ignitable gas is generated in the exhaust gas; the drilling cuttings in the pyrolysis furnace are cooled along with the furnace and are grounded; and the specific surface area of the powder after grinding is controlled to about 250 m²/Kg;

(2) the pyrolysis drilling cuttings after grinding are placed in two crucibles respectively and subjected to heat treatment for the second time, and the heating and heat preservation programs are controlled strictly (the temperature is raised from room temperature to about 800° C. again, the heating time is 50 min; the temperature is preserved at 800° C., and the heat preservation time is 70 min; the temperature is continuously raised to 1000° C., and the heating time is 40 min; the temperature is preserved at 1000° C., and the heat preservation time is 80 min). The heat-treated material after the heat preservation is immediately poured into a quenching medium for quenching treatment, and water or liquid nitrogen is used as the quenching medium during the quenching process. After the quenching is completed, the powder is placed in an oven at 60° C. and dried for 24 hours; the powder is then taken out and ground; and the specific surface area of the ground powder is controlled to be 400 m²/Kg to obtain a microparticle suspension stabilizer.

What is claimed is:

1. An oil well cement slurry suspension stabilizer prepared from oil-based shale drilling cuttings by a method comprising the following steps:
   (1) performing preliminary pyrolysis on the oil-based shale drilling cuttings produced from a shale formation in a pyrolysis furnace under a heating program in an air atmosphere in which the temperature is raised from room temperature to 350-400° C., the heating time is 30-45 min; then the temperature is preserved at 350-400° C., and the heat preservation time is 75-90 min; grinding the oil-based shale drilling cuttings after the preliminary pyrolysis and controlling a specific surface area of particle size after grinding to 200-300 m²/Kg; and
   (2) placing the oil-based shale drilling cuttings after the preliminary pyrolysis and grinding in a corundum crucible and putting the corundum crucible in a resistance furnace, and performing heat treatment for a second time under conditions as follows: the temperature is raised from room temperature to 800° C., the heating time is 45-60 min; then the temperature is preserved at 800° C., and the heat preservation time is 60-75 min; then the temperature is continuously raised to 1000° C., and the heating time is 30-45 min; then the temperature is preserved at 1000° C., and the heat preservation time is 60-90 min; then, cooling in a quenching and shock cooling manner, drying at 60° C. for 24 h, and grinding to obtain powder having a specific surface area of 400 m²/Kg, thereby which the oil well cement slurry suspension stabilizer is prepared.

2. The oil well cement slurry suspension stabilizer prepared from oil-based shale drilling cuttings according to claim 1, wherein the oil-based shale drilling cuttings are drilling cuttings produced when natural gas is extracted by drilling in an oily drilling fluid environment in a shale formation.

3. The oil well cement slurry suspension stabilizer prepared from oil-based shale drilling cuttings according to claim 2, wherein the oil-based shale drilling cuttings are taken from black shale of a Silurian Longmaxi Formation.

4. The oil well cement slurry suspension stabilizer prepared from oil-based shale drilling cuttings according to claim 1, wherein, in the quenching and shock cooling process, water or liquid nitrogen is used as a quenching medium.

* * * * *